T. H. WILLIAMS.
GRAPPLE.
APPLICATION FILED SEPT. 10, 1908.

944,644.

Patented Dec. 28, 1909.

WITNESSES:

INVENTOR
THOMAS H. WILLIAMS
BY Robinson, Martin & Jones
ATTORNEYS

UNITED STATES PATENT OFFICE.

THOMAS H. WILLIAMS, OF UTICA, NEW YORK.

GRAPPLE.

944,644. Specification of Letters Patent. Patented Dec. 28, 1909.

Application filed September 10, 1908. Serial No. 452,463.

*To all whom it may concern:*

Be it known that I, THOMAS H. WILLIAMS, of Utica, in the county of Oneida and State of New York, have invented certain new and useful Improvements in Grapples; and I do hereby declare that the following is a full, clear, and exact description thereof, which will enable others skilled in the art to which it appertains to make and use the same, reference being had to the accompanying drawings, and to the characters of reference marked thereon, which form part of this specification.

The object of my present invention is to provide a grapple particularly intended for handling outside coffin boxes of cement, but obviously adapted for other uses, which grapple is simple in construction and well adapted to meet the requirements of such a device in use.

Outside coffin boxes of cement are heavy, more or less delicate and subject to breakage and require to be handled into and out of graves that are but slightly larger than the box. This grapple safely handles the box and may be placed or released in a very confined space.

Figure 1:
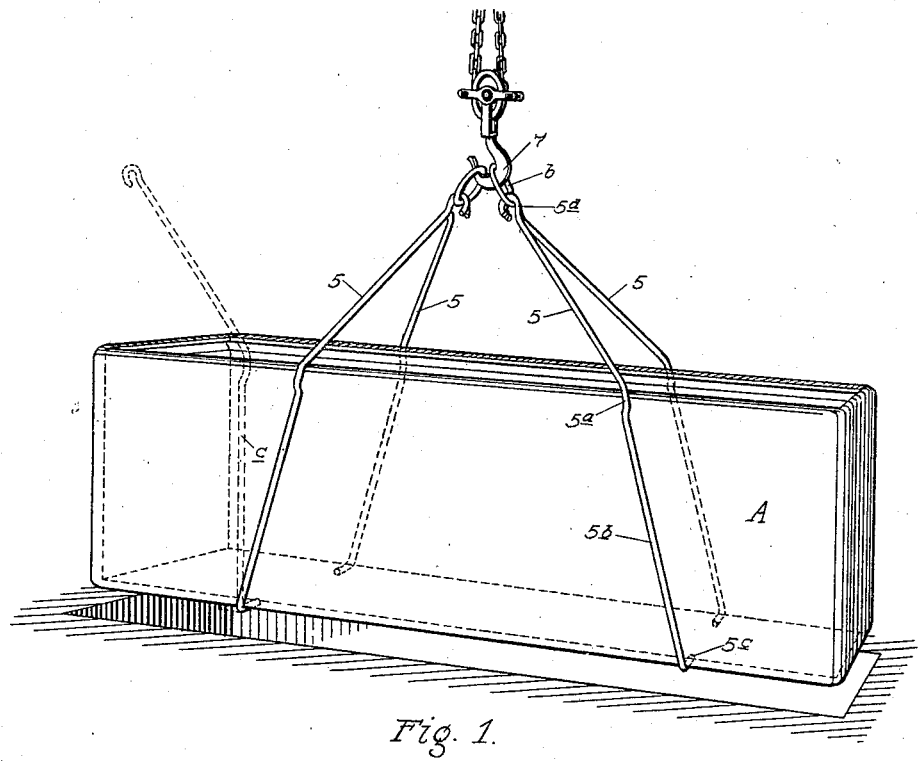
Figure 2:
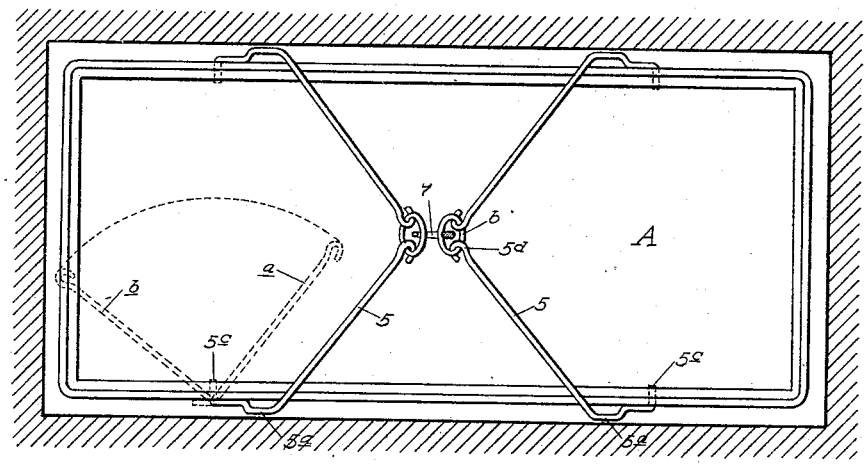

Figure 1 shows a perspective view of the grapple device in use on an outside coffin box. Fig. 2 is a plan view of the same.

Referring to the reference letters and figures in a more particular description, 5 indicates the rigid parts of which the grapple is mainly formed, the same being provided in a set of four. These parts or rigid bars have the straight stem portion $5^b$, with an inwardly turned end hook $5^c$ at the lower end and an angularly arranged converging portion at the upper end the latter carrying the hook $5^d$ at its upper end. In addition the bars 5 are provided with an outwardly standing bend $5^a$. The hooks $5^d$ are adapted to engage with rings as $b$, which rings in turn are adapted to be engaged by a hook as 7 of a tackle or hoist. When applied to a cement box, as A, the stem portions $5^b$ bear on the sides of the box and the hooks $5^c$ engage under the lower edge thereof. The outwardly standing bends $5^a$ carry the bars away from the upper edge of the box A and obviate any danger of breakage of the edge by pressure thereon.

It is obvious that when arranged as shown in Figs. 1 and 2 the grapple will support a box by means of a hoist or tackle, and that it may be lowered into or raised from a hole in the ground which was not materially larger in area than is the box.

When the box A is lowered into place, it is obvious that by detaching the hook 7 and removing the rings $b$ each bar is independent. They may then be moved severally, so that the stem portion $5^b$ will occupy a vertical position, as shown in dotted lines at $c$ in Fig. 1. When in this position the angular upper end may be used as a crank to rotate the stem portion, this crank moving from the position shown in dotted lines at $a$ in Fig. 2 to the position shown in dotted lines by $b$ in the same figure. This rotary movement releases the hook $5^c$ and the bar can be withdrawn upwardly and removed.

It is obvious that the grapple can be applied to a box already in the ground by reversing the operations just described. The straight stem portion $5^b$ with the hook $5^c$ may be readily forced down alongside of the box until the hooked end is passed below the lower edge of the box, when the rotary movement will bring it into engaging position under the edge.

What I claim as new and desire to secure by Letters Patent is:

1. A grapple consisting of a set of four similar separable rigid parts 5, each consisting of a straight stem portion $5^b$ and angularly arranged converging portion, and having at the lower end inturned hook $5^c$ and connectible means for collectively handling the parts with which the upper ends of the converging portions are arranged to detachably engage, substantially as set forth.

2. A grapple consisting of a set of four similar separable rigid parts 5, each consisting of a straight stem portion $5^b$, and angularly arranged converging portions having at the lower end an inturned hook $5^c$ and at the upper end an open hook $5^d$, connectible means for collectively handling the parts with which the hooks $5^d$ are arranged to detachably engage, substantially as set forth.

In witness whereof, I have affixed my signature, in presence of two witnesses, this 7 day of September, 1908.

THOMAS H. WILLIAMS.

Witnesses:
S. I. DE VINE,
W. H. WILLER.